United States Patent
Ghannam et al.

(10) Patent No.: US 10,421,344 B2
(45) Date of Patent: Sep. 24, 2019

(54) WINDSHIELD BARRIER

(71) Applicant: Ford Global Technologies, LLC, Dearborn, MI (US)

(72) Inventors: Mahmoud Yousef Ghannam, Canton, MI (US); Swadad A. Carremm, Canton, MI (US); Aed M. Dudar, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 151 days.

(21) Appl. No.: 15/596,091

(22) Filed: May 16, 2017

(65) Prior Publication Data
US 2018/0334021 A1    Nov. 22, 2018

(51) Int. Cl.
| | | |
|---|---|---|
| *B60J 11/08* | (2006.01) | |
| *G05D 1/00* | (2006.01) | |
| *B60J 1/20* | (2006.01) | |
| *G01S 19/13* | (2010.01) | |

(52) U.S. Cl.
CPC ............. *B60J 11/08* (2013.01); *B60J 1/2094* (2013.01); *G05D 1/0088* (2013.01); *G01S 19/13* (2013.01)

(58) Field of Classification Search
CPC ......... B60J 11/08; G05D 1/0088; G01S 19/13
USPC .......................................................... 701/49
See application file for complete search history.

(56) References Cited

U.S. PATENT DOCUMENTS

| | | | | |
|---|---|---|---|---|
| 4,867,220 A | * | 9/1989 | Matsumoto | ............ B60J 7/0023 160/35 |
| 4,886,104 A | * | 12/1989 | Eldridge, Jr. | .......... B60J 1/2091 160/370.23 |
| 5,186,511 A | * | 2/1993 | Hwang | ....................... B60J 1/20 296/152 |
| 5,746,469 A | * | 5/1998 | Nonaka | .................. B60J 1/2011 296/97.4 |
| 5,762,393 A | * | 6/1998 | Darmas, Sr. | ........... B60J 11/025 296/136.01 |
| 6,012,759 A | * | 1/2000 | Adamek | ................... B60J 11/02 296/136.03 |
| 6,095,231 A | * | 8/2000 | Hahn | ..................... B60J 1/2019 160/265 |

(Continued)

FOREIGN PATENT DOCUMENTS

| | | | |
|---|---|---|---|
| CN | 2284164 Y | * | 6/1998 |
| CN | 201105705 Y | | 8/2008 |

(Continued)

OTHER PUBLICATIONS

Search Report from United Kingdom Intellectual Property Office dated Oct. 31, 2018 regarding Application No. GB1807849.3 (5 pages).

*Primary Examiner* — Tuan C To
(74) *Attorney, Agent, or Firm* — Frank A. MacKenzie; Bejin Bieneman PLC (57) ABSTRACT

A vehicle includes a windshield, a barrier, a barrier actuator drivably coupled to the barrier, and a computer in communication with the barrier actuator. The barrier is movable between a retracted position exposing the windshield and an expanded position extending along a portion of the windshield. The computer is programmed to, upon determining that a risk of objects striking the windshield exceeds a threshold while the vehicle is traveling, instruct the barrier actuator to move the barrier from the retracted position to the expanded position.

19 Claims, 7 Drawing Sheets

(56) References Cited

U.S. PATENT DOCUMENTS

| | | | |
|---|---|---|---|
| 6,168,225 B1* | 1/2001 | Deng | B60J 11/00 296/136.04 |
| 6,206,451 B1 | 3/2001 | Maano | |
| 6,227,599 B1* | 5/2001 | Campfield | B32B 17/10018 296/136.07 |
| 6,276,742 B1* | 8/2001 | Deng | B60J 11/00 160/370.21 |
| 7,562,928 B1* | 7/2009 | Morazan | B60J 11/00 296/136.01 |
| 7,967,366 B1* | 6/2011 | Tellez | B60J 11/02 296/136.02 |
| 8,419,107 B2* | 4/2013 | Manchanda | B60J 11/06 296/136.1 |
| 9,283,834 B1* | 3/2016 | Khoury | G09F 21/048 |
| 10,063,110 B2 | 8/2018 | Meichle | |
| 2006/0066128 A1* | 3/2006 | Walker | B60J 1/20 296/95.1 |
| 2006/0213714 A1* | 9/2006 | Igawa | B60R 21/0134 180/274 |
| 2009/0045648 A1 | 2/2009 | Hintennach et al. | |
| 2012/0016553 A1* | 1/2012 | Bai | H04L 1/0002 701/31.5 |
| 2013/0320103 A1* | 12/2013 | Margalit | B64D 45/00 239/1 |
| 2015/0075735 A1* | 3/2015 | Sene | B60J 3/002 160/370.21 |
| 2015/0166072 A1* | 6/2015 | Powers | B60W 40/06 701/1 |
| 2016/0288764 A1 | 10/2016 | Suzuki | |
| 2017/0203712 A1* | 7/2017 | Aiba | G06K 9/2054 |
| 2018/0143298 A1 | 5/2018 | Newman | |
| 2018/0181133 A1 | 6/2018 | Zhang et al. | |
| 2018/0284268 A1 | 10/2018 | McWhirter | |
| 2018/0319376 A1 | 11/2018 | Dusina et al. | |

FOREIGN PATENT DOCUMENTS

| | | | |
|---|---|---|---|
| CN | 201777216 U | * | 3/2011 |
| CN | 203047153 U | | 7/2013 |
| CN | 106427490 A | | 2/2017 |
| DE | 19937461 A1 | | 2/2001 |
| EP | 1431142 A2 | * | 6/2004 ............ B60S 1/0822 |
| GB | 2530405 A | | 3/2016 |
| JP | H11301283 A | | 11/1999 |
| KR | 0159855 B1 | | 1/1999 |
| KR | 1020160043274 A | | 4/2016 |
| WO | WO 2012017217 A1 | | 2/2012 |

* cited by examiner

WINDSHIELD BARRIER

BACKGROUND

Vehicles include windshields. The windshield is positioned facing forward between a hood and a roof of the vehicle. The windshield is positioned in front of a driver of the vehicle so that the driver can see forward through the windshield while the vehicle is traveling. The windshield is formed of a durable transparent material, for example, glass such as laminated, tempered glass or plastic such as Plexiglas or polycarbonate.

SUMMARY

A vehicle includes a windshield, a barrier, a barrier actuator drivably coupled to the barrier, and a computer in communication with the barrier actuator. The barrier is movable between a retracted position exposing the windshield and an expanded position extending along a portion of the windshield. The computer is programmed to, upon determining that a risk of objects striking the windshield exceeds a threshold while the vehicle is traveling, instruct the barrier actuator to move the barrier from the retracted position to the expanded position.

The vehicle may include a shaft attached to the windshield. The barrier in the retracted position may be wrapped about the shaft, and the barrier in the expanded position may extend from the shaft over the windshield. The shaft may be positioned one of above and below the windshield, and may extend substantially a length of the windshield. The vehicle may include a roof extending from the windshield, and two roof rails extending from the roof. The shaft may extend from a first to a second of the roof rails. The vehicle may include two A pillars fixed to the windshield. The A pillars may each include a channel extending lengthwise, and the barrier may include two pins, each pin disposed in one of the channels. Each channel may have a cross-section including an opening extending from a surface of the corresponding A pillar and a passageway connected to the opening. The passageways may be wider than the openings, and the pins may each have a sliding portion that is wider than the opening disposed in the corresponding passageway. The barrier actuator may include a motor drivably coupled to the shaft and in communication with the computer. The barrier may include a plurality of ribs extending substantially parallel to the shaft. The vehicle may include a sensor having a field of view and fixed relative to the windshield. The barrier may have a transparent panel that is positioned in the field of view of the sensor when the barrier is in the expanded position.

The barrier may include a first rod, a second rod pivotally coupled to the first rod at a pivot point, and a barrier sheet extending from the first rod to the second rod. The barrier sheet may include a plurality of folds extending in a direction from the pivot point. An angle between the rods at the pivot point may be greater when the barrier is in the expanded position than the retracted position. The barrier may include a plurality of wires embedded in the barrier sheet. Each of the wires may extend substantially parallel to a corresponding fold of the plurality of folds. The vehicle may include a housing fixed with respect to the windshield. The barrier in the retracted position may be disposed in the housing, and the barrier in the expanded position may extend out of the housing over the windshield.

The computer may be further programmed to determine the risk based on receiving a signal from a sensor indicating that an object has struck the windshield.

The computer may be further programmed to determine the risk based on weather data indicating one of hail and high winds.

The computer may be further programmed to determine the risk based on receiving a vehicle-to-vehicle communication from a second vehicle indicating that an object has struck the second vehicle.

The computer may be further programmed to determine the risk based on a road status of a road on which the vehicle is traveling.

The computer may be further programmed to instruct the barrier to move from the retracted position to the expanded position based on the risk and based on the computer operating the vehicle autonomously.

A method includes determining whether a risk of objects striking a windshield of a vehicle exceeds a threshold, and while the vehicle is traveling, upon determining the risk exceeds the threshold, instructing a barrier actuator drivably coupled to the barrier to move the barrier from a retracted position exposing the windshield to an expanded position extending along a portion of the windshield.

DETAILED DESCRIPTION

The vehicle is equipped to protect itself from impacts to the windshield. The barrier may provide protection to the windshield by preventing objects from directly striking the windshield and absorbing the kinetic energy of the objects. Reduced damage to the windshield lowers the cost of repairing the vehicle and keeps the windshield less obstructed for when an occupant of the vehicle wants to look through the windshield. Furthermore, the vehicle can deploy the barrier only in situations in which the barrier will not interfere with driving the vehicle, that is, when the vehicle is stationary or when the vehicle is being driven autonomously.

Figure 1:
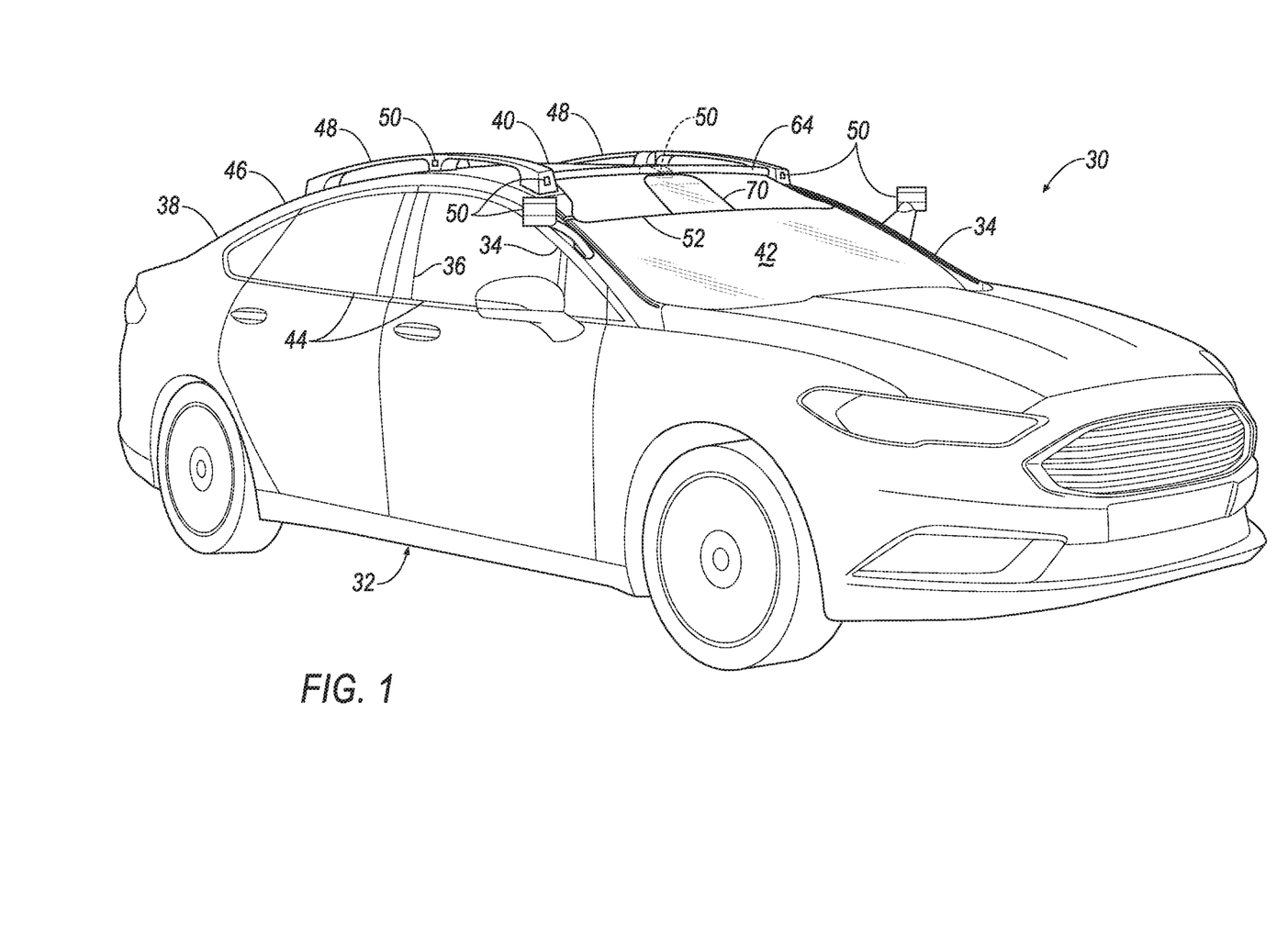
FIG. 1 is a perspective view of a first example of an exemplary vehicle having a windshield barrier in a retracted position.
Figure 2:
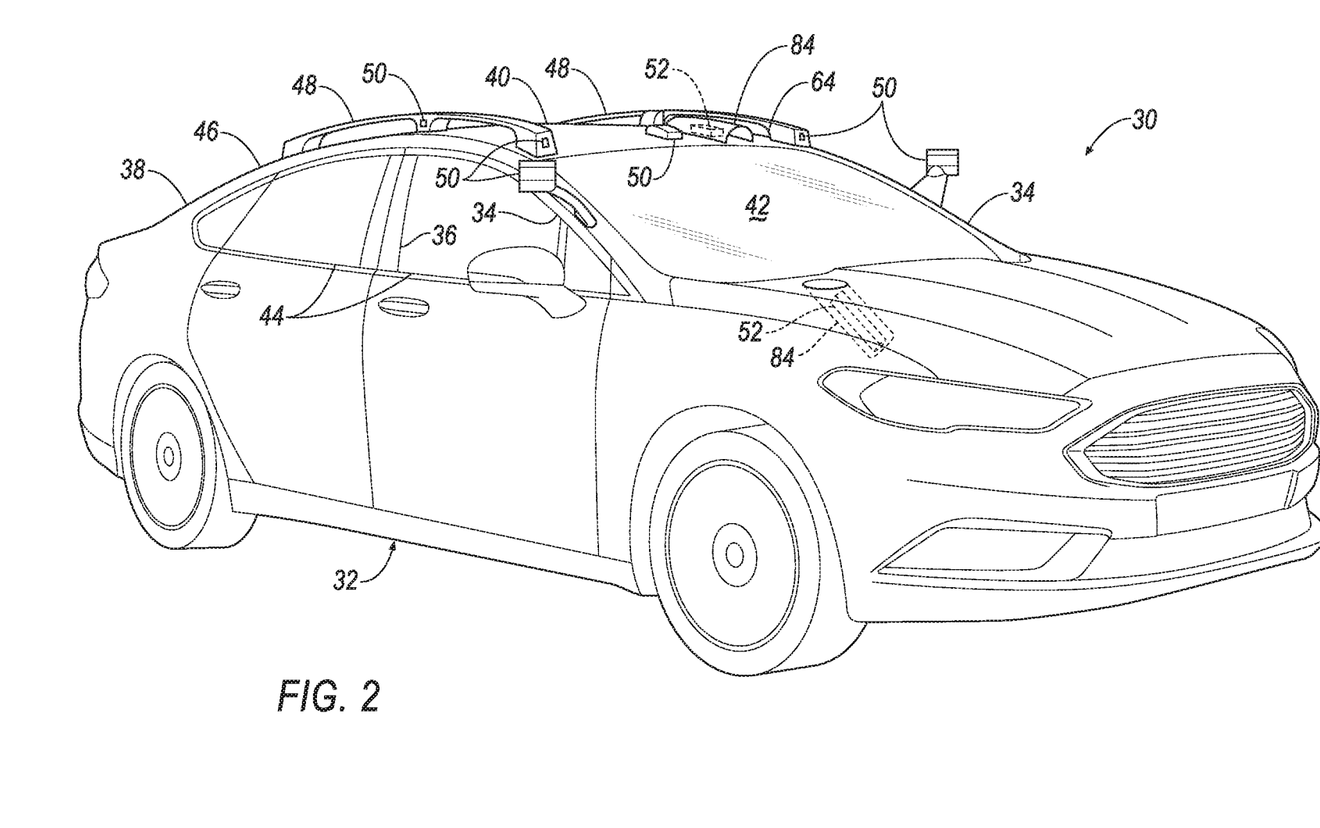
FIG. 2 is a perspective view of a second example of the vehicle having the windshield barrier in the retracted position.

With reference to FIGS. 1 and 2, a body 32 of a vehicle 30 may include A pillars 34, B pillars 36, C pillars 38, and a roof 40. The two A pillars 34 are fixed to a windshield 42 and may extend between the windshield 42 and windows 44. The B pillars 36 may extend between the windows 44 of adjacent doors. The C pillars 38 may extend between the windows 44 and a backlite 46. The body 32 may also include D pillars (not shown) if the vehicle 30 is, e.g., an SUV, crossover, minivan, or station wagon, in which case the C pillars 38 extend between the windows 44 of rear doors and rear left and right windows 44, and the D pillars extend between the rear right and left windows 44 and the backlite 46. The roof 40 extends from the windshield 42 to the backlite 46 along the windows 44, and the roof 40 extends from the A pillar 34 to the B pillar 36 to the C pillar 38.

The windshield 42, backlite 46, and windows 44 may be formed of any suitably durable transparent material, including glass such as laminated, tempered glass or plastic such as Plexiglas or polycarbonate. The windshield 42, backlite 46, and windows 44 may be formed of the same material or different materials from each other. The windshield 42 is located adjacent the A pillars 34.

Two roof rails 48 extend from the roof 40. The roof rails 48 may extend in a generally forward direction, generally parallel with each other. The roof rails 48 may be positioned near respective A pillars 34. The roof rails 48 may be positioned laterally relative to each other. The vehicle 30 may include sensors 50 mounted at various locations in or on the vehicle 30, as described below, and some of the sensors 50 may be mounted to the roof rails 48.

With continued reference to FIGS. 1 and 2, the vehicle 30 includes a barrier 52 for protecting the windshield 42 from objects striking the windshield 42, e.g., rocks, road debris, hail. The barrier 52 is provided to absorb an impact from an object that would have fractured the windshield 42 without the barrier 52. The barrier 52 may prevent force from an impact, e.g., with a rock with a diameter of ½ inch and a speed relative to the vehicle 30 of 80 miles per hour, from transferring to the windshield 42, or permit at most a transfer of force that does not damage the windshield 42. Suitable materials for the barrier 52, e.g., metal or plastic, may be selected accordingly; a suitability of a material and an appropriate thickness can be established by, e.g., computer simulations and/or laboratory testing.

Figure 5:
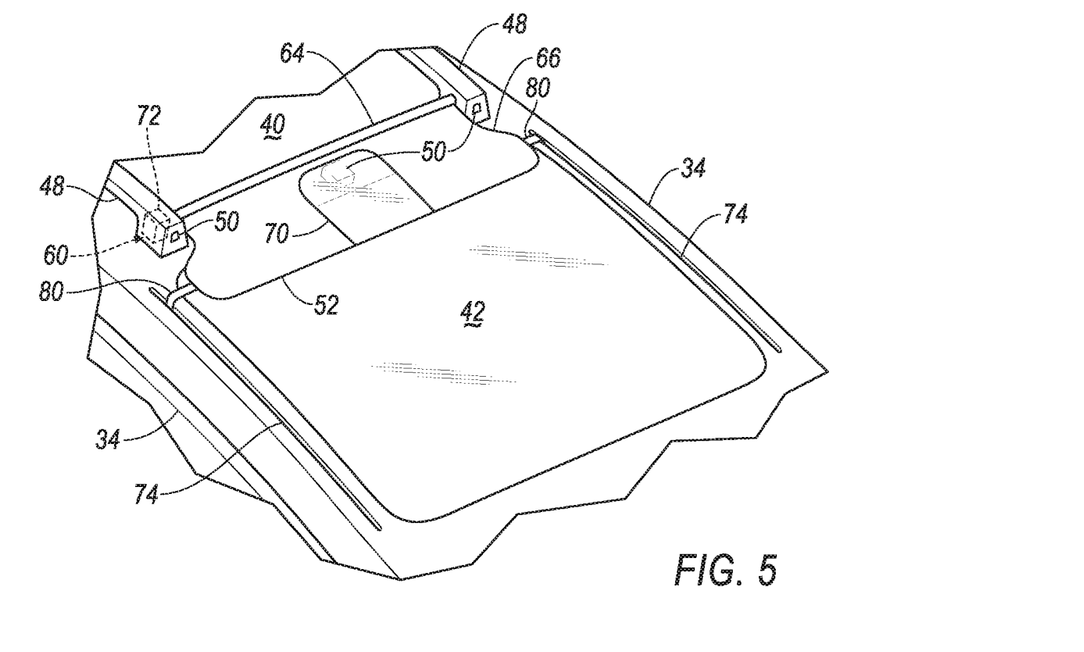
FIG. 5 is a perspective view of a portion of the first example of the vehicle with the windshield barrier in the retracted position.
Figure 6:
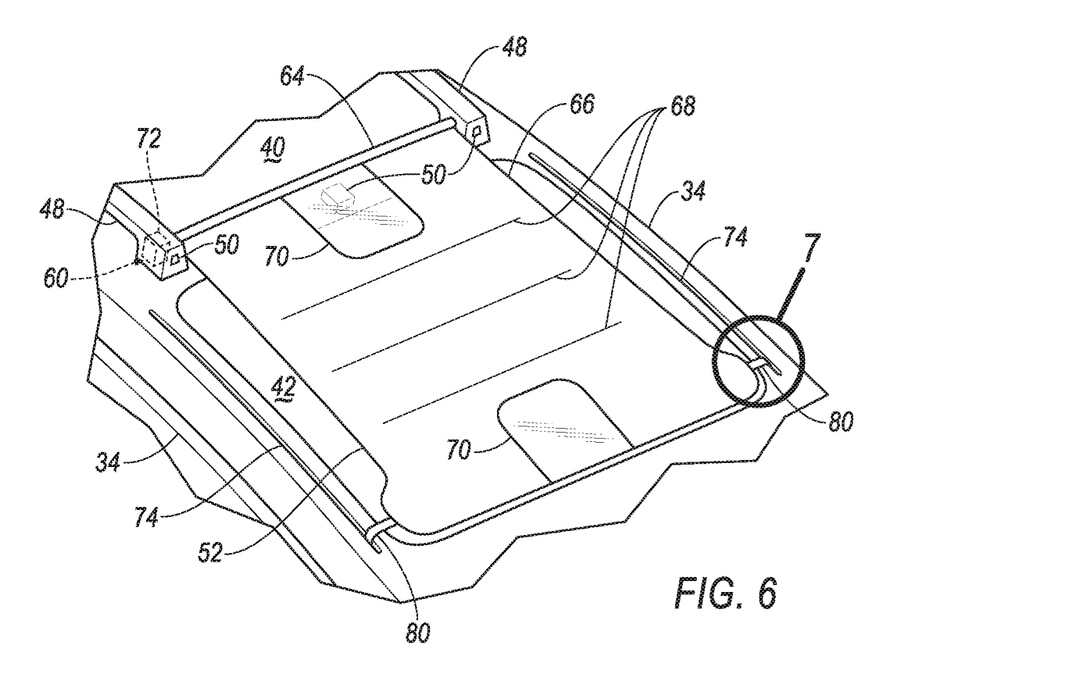
FIG. 6 is a perspective view of a portion of the first example of the vehicle with the windshield barrier in the expanded position.
Figure 9:
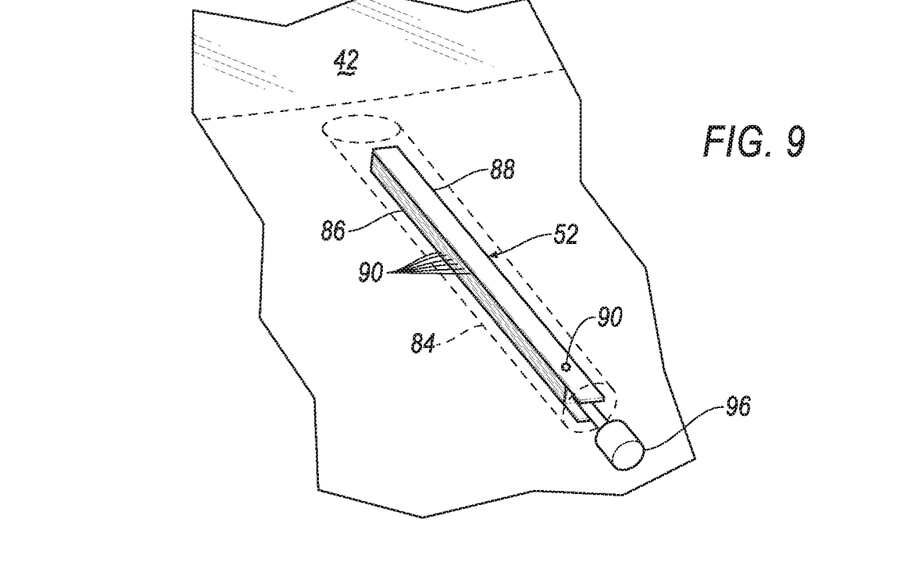
FIG. 9 is a perspective view of a portion of the second example of the vehicle with the windshield barrier in the retracted position.
Figure 10:
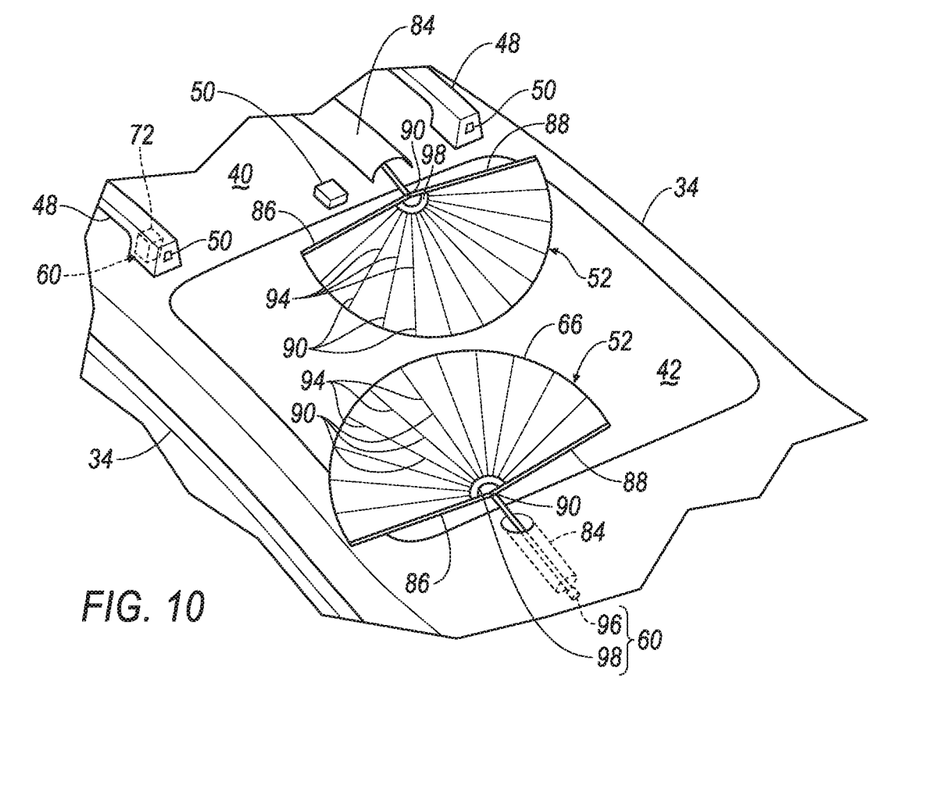
FIG. 10 is a perspective view of a portion of the second example of the vehicle with the windshield barrier in the expanded position.

The barrier 52 is movable between a retracted position exposing the windshield 42, as shown in FIGS. 1, 2, 5, and 9, and an expanded position extending along a portion of the windshield 42, as shown in FIGS. 6 and 10. The retracted position exposes most of the windshield 42, e.g., at least 75% of the windshield 42 as measured by surface area, and allows an occupant of the vehicle 30 to see through the windshield 42 unobstructed. The expanded position covers, that is, extends along, more of the windshield 42 than the retracted position, as measured by surface area of the windshield 42 that is covered. The expanded position may cover a majority of the exterior surface area of, e.g., most of the windshield 42, e.g., at least 75% of the surface area of the windshield 42. The barrier 52 is described in more detail below with respect to particular examples.

Figure 3:
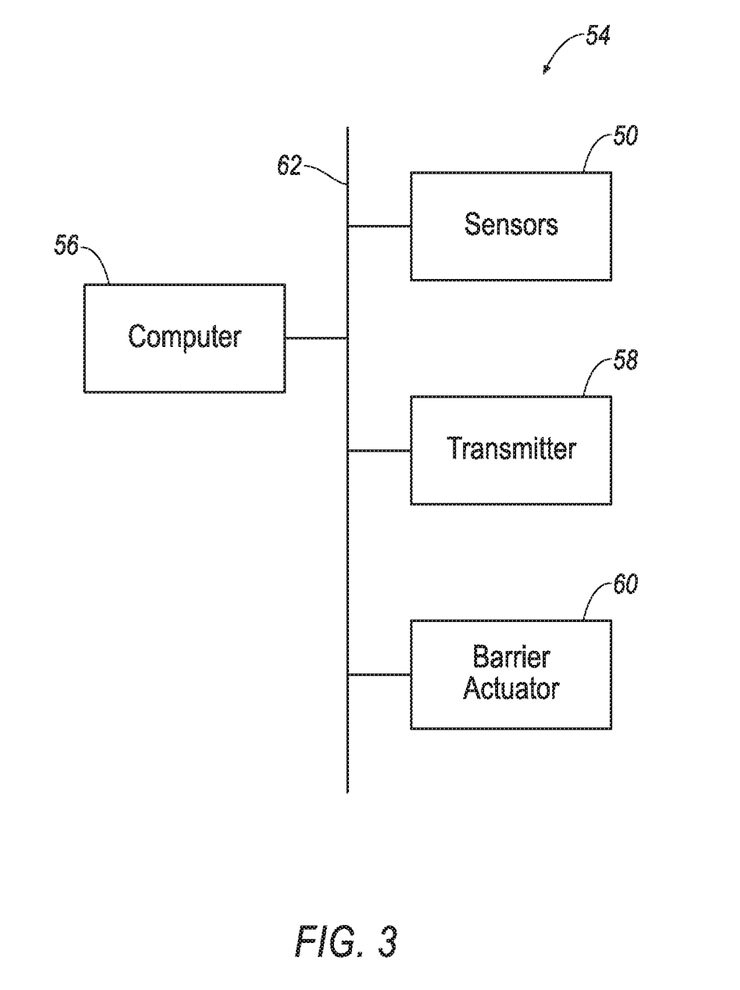
FIG. 3 is a block diagram of an exemplary control system of the vehicle.

With reference to FIG. 3, a control system 54 controls operation of the barrier 52. The control system 54 includes a computer 56, the sensors 50, a transceiver 58, and a barrier actuator 60. The control system 54 may transmit signals through a communications network 62 such as a controller area network (CAN) bus, Ethernet, Local Interconnect Network (LIN), and/or by any other wired or wireless communications network. The computer 56 is in communication with the sensors 50, the transceiver 58, and the barrier actuator 60 through the communications network 62.

The barrier actuator 60 is drivably coupled to the barrier 52. The barrier actuator 60 is configured to move the barrier 52 from the retracted position to the expanded position and vice versa. The barrier actuator 60 is described in more detail below with respect to various examples.

With reference to FIGS. 1-3, the vehicle 30 includes the sensors 50. The sensors 50 may provide data about operation of the vehicle 30, for example, wheel speed, wheel orientation, and engine and transmission data (e.g., temperature, fuel consumption, etc.). The sensors 50 may detect the position or orientation of the vehicle 30. For example, the sensors 50 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 50 may detect the external world. For example, the sensors 50 may include radar sensors, scanning laser range finders, light detection and ranging (LIDAR) devices, and image processing sensors such as cameras. These sensors 50 may have a field of view and be fixed relative to the windshield 42. The sensors 50 may include communications devices, for example, vehicle-to-infrastructure (V2I) or vehicle-to-vehicle (V2V) devices.

Operating data of the vehicle 30 includes data about operation of the vehicle 30 described above, and is generally defined for purposes of this disclosure as any data received by the computer 56 describing movement of the vehicle 30 or one or more states of one or more vehicle components (e.g., speed of wheels, acceleration, steering angle, etc.) and/or data about environmental and/or road conditions while the vehicle is moving. Environmental conditions are defined as data values describing an environment in which the vehicle 30 is traveling, and can include ambient (outside) temperature, presence or absence of precipitation, type of precipitation (e.g., rain, snow, hail, etc.), amount of ambient light (e.g., brightness of daylight), etc. Road conditions are defined as data values describing one or more conditions of a road on which the vehicle 30 is traveling, and can include a coefficient of friction, a type of road surface (e.g., asphalt, gravel, dirt, etc.), an indication of detected coatings (e.g., water, ice, oil, etc.), etc.

With reference to FIG. 3, the transceiver 58 may be adapted to transmit signals wirelessly through any suitable wireless communication protocol, such as Bluetooth®, WiFi, IEEE 802.11a/b/g, other RF (radio frequency) communications, etc. The transceiver 58 may be adapted to communicate with a remote server, that is, a server distinct and spaced from the vehicle 30. The remote server may be located outside the vehicle 30. For example, the remote server may be associated with other vehicles (e.g., V2V communications), infrastructure components (e.g., V2I communications), emergency responders, mobile devices associated with the owner of the vehicle 30, etc. The transceiver 58 may be one device or may include a separate transmitter and receiver.

The computer 56 may be a microprocessor-based controller. The computer 56 may include a processor, memory, etc. The memory of the computer 56 may include memory for storing instructions executable by the processor as well as for electronically storing data and/or databases.

Figure 4:
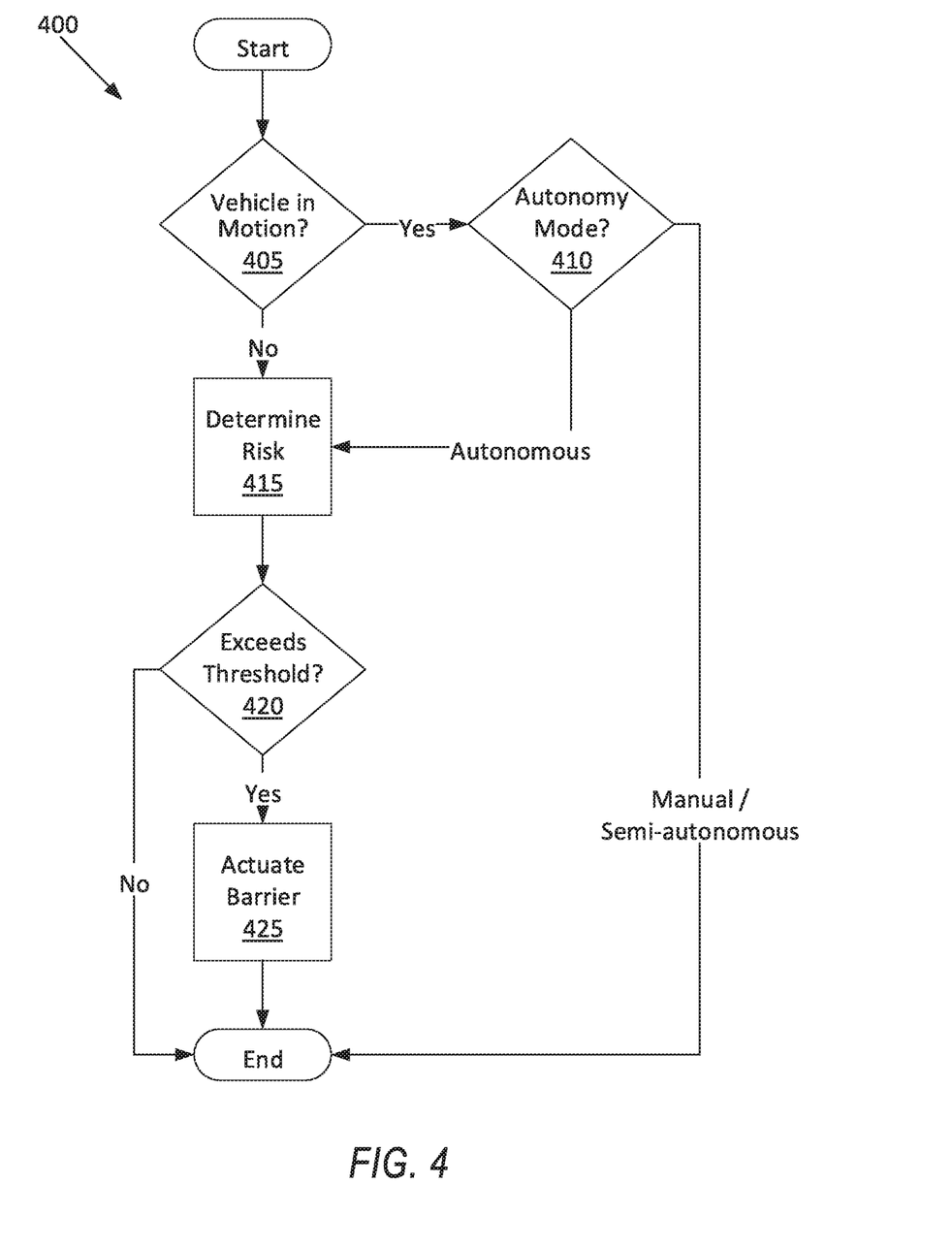
FIG. 4 is a process flow diagram of an exemplary process for operating the windshield barrier.

FIG. 4 is a process flow diagram illustrating an exemplary process 400 for operating the barrier 52. The computer 56 includes programming for performing the steps of the process 400.

The process 400 begins in a block 405, in which the computer 56 receives data indicating road conditions. The road conditions may be received from map data based on a location of the vehicle 30. The map data may be received from a remote server via the transceiver 58 or stored in the memory of the computer 56. Alternatively or additionally, the road conditions may be determined from vibration data from a suspension system (not shown) of the vehicle 30. Vibration data such as amplitude and frequency of suspension vibration may be associated with, e.g., types of roads such as gravel or paved, or simply a "bumpiness" value.

Next, in a block 410, the computer 56 receives environmental data. The environmental data may include weather data received from a remote server via the transceiver 58. The environmental data may include data received from the sensors 50. For example, the sensors 50 may include a sensor, e.g., a piezoelectric sensor, coupled to the windshield 42 to detect vibrations from, e.g., precipitation. Vibration data such as amplitude and frequency may be associated with, e.g., types of precipitation such as rain or hail. For another example, the sensors 50 may include a thermometer.

Next, in a block 415, the computer 56 receives data about an object striking the windshield 42, if any. For example, the piezoelectric sensor of the sensors may detect vibration data including a nonrepeating amplitude associated with an object such as a rock striking the windshield 42.

Next, in a block 420, the computer 56 receives a vehicle-to-vehicle communication, if any, from a second vehicle indicating an object struck the second vehicle. The vehicle-to-vehicle communication may be received through the transceiver 58.

Next, in a decision block 425, the computer 56 determines whether the vehicle 30 is traveling, in other words, whether the vehicle 30 is in motion. If the vehicle 30 is traveling, the process 400 proceeds to a decision block 430. If the vehicle 30 is parked or otherwise not being operated, the process 400 proceeds to a block 435.

If the vehicle 30 is traveling, next, in the decision block 430, the computer 56 determines an autonomy mode in which the vehicle 30 is operating. The autonomy mode may be one of an autonomous mode, a semi-autonomous mode, and a manual mode. In the context of this disclosure, an autonomous mode is defined as one in which each of a propulsion, a brake system, and a steering of the vehicle 30 are controlled by one or more computers, such as the computer 56. A semi-autonomous mode is defined as one in which one or two of the propulsion, braking, and steering are controlled by the computers or as one in which all three of the propulsion, brake system, and steering are controlled by the computers but in which control may be handed over to a human driver based on circumstances. A manual mode is defined as one in which a human driver controls each of the propulsion, brake system, and steering. If the autonomy mode is the autonomous mode, that is, if the computer 56 is operating the vehicle 30 autonomously, the process 400 proceeds to the block 415. If the autonomy mode is the semi-autonomous mode or the manual mode, the process 400 ends; in other words, the barrier 52 does not deploy if a human driver is or might begin operating the vehicle 30.

After the decision block 425, if the vehicle 30 is not traveling, or after the decision block 430 if the vehicle 30 is operating autonomously, in the block 435, the computer 56 determines the risk of an object striking the windshield 42.

The risk may be, for example, an estimate of a probability of an object striking the windshield 42 within a preset duration, based on, e.g., the operating data and road conditions. For another example, the risk may be a score based on a presence of risk factors in the operating data and road conditions. For the purposes of this disclosure, a risk factor is defined as a measurable quantity having a correlation with the probability of an object striking the windshield 42, e.g., an occurrence of an object striking the windshield 42, an occurrence of an object striking a nearby vehicle, a weather forecast of hail, a weather forecast of high winds, and a road condition. Information for determining the risk may include receiving data from one of the sensors 50 indicating that an object has struck the windshield 42 and/or receiving a vehicle-to-vehicle communication via the transceiver 58 from a second vehicle indicating that an object has struck the second vehicle. If an object has struck the windshield 42 or a nearby vehicle 30, the strike may have occurred because a surrounding area has a greater likelihood of objects striking the windshield 42. Other information for determining the risk may include weather data indicating one of hail and high winds. Other information for determining the risk may include a road condition of a road on which the vehicle 30 is traveling. The road condition may be, e.g., "gravel road" or "poorly maintained road" or "construction zone." As one example, the risk may be a score calculated as a weighted sum of a plurality of the risk factors, such as in the following formula:

$$R = w_{weather} X_{weather} + w_{road} X_{road} + w_{object} X_{object}$$

in which R is a risk score; $X_{weather}$ is a value ranging from zero to one indicating a chance of hail taken from weather data; $X_{road}$ is a measure of vibration data from the suspension system of the vehicle 30; $X_{object}$ is a binary variable equal to one if an object has struck the windshield 42 or a nearby vehicle and equal to zero otherwise; and $w_{weather}$, $w_{road}$, and $w_{object}$ are weights for scaling $X_{weather}$, $X_{road}$, and $X_{object}$ so that they may be commensurably summed.

Next, in a decision block 440, the computer 56 determines whether the risk of objects striking the windshield 42 exceeds a threshold. The threshold may be represented like the risk, e.g., a probability or a score. For example, the threshold may be chosen so that the risk score R exceeds the threshold when either $X_{weather}$ exceeds 0.7 (i.e., 70% chance of hail), $X_{road}$ indicates a gravel road, or $X_{object}$ equals one. If the risk does not exceed the threshold, the process 400 ends; in other words, the barrier 52 does not deploy from the retracted to the expanded position.

If the risk exceeds the threshold, next, in a block 445, the computer 56 instructs the barrier actuator 60 to move the barrier 52 from the retracted position to the expanded position. The barrier 52 is thus in position to protect the windshield 42 from impacts. After the block 445, the process 400 ends.

FIGS. 1 and 5-8 depict a first example of the vehicle 30 having the barrier 52. The first example includes a shaft 64 about which the barrier 52 is wrapped and which rolls and unrolls the barrier 52.

With reference to FIGS. 5 and 6, the shaft 64 is attached to the windshield 42. Specifically, as shown in FIGS. 5 and 6, the shaft 64 is attached indirectly to the windshield 42 through the roof 40 and the roof rails 48. The shaft 64 may extend from a first of the roof rails 48 to a second of the roof rails 48. The shaft 64 may extend laterally relative to rest of the vehicle 30. The shaft 64 may be positioned alongside an edge of the windshield 42, e.g., above or below the windshield 42. The shaft 64 may extend substantially a length of the edge of the windshield 42 alongside which the shaft 64 is positioned, e.g., substantially a length of the windshield 42, as shown in FIGS. 5 and 6. The shaft 64 may have a cylindrical shape.

The barrier 52 in the retracted position is wrapped about the shaft 64, as shown in FIG. 5, and the barrier 52 in the expanded position extends from the shaft 64 over the windshield 42, as shown in FIG. 6.

The barrier 52 may include a barrier sheet 66 and a plurality of ribs 68. The ribs 68 may be stiff, e.g., stiffer than the barrier sheet 66, i.e., a greater force is required to bend the ribs 68 than to bend the barrier sheet 66. The barrier sheet 66 may be formed of, e.g., polyester fabric or resin wicker. Resin wicker may be formed of strands of PVC, nylon, polyethylene, or high-density polyethylene. The ribs 68 may extend substantially parallel to the shaft 64. The ribs 68 may be oriented so that the ribs 68 are not bent when the barrier 52 is wrapped about the shaft 64 in the retracted position. The ribs 68 may be, e.g., fixed to the barrier sheet 66 with adhesive or disposed in respective sleeves (not shown). The ribs 68 may be evenly spaced from one another. The ribs 68 may be formed of, e.g., rigid plastic or metal such as aluminum. The ribs 68 may prevent the barrier 52 from separating from the windshield 42.

The barrier 52 may have one or more transparent panels 70. One of the transparent panels 70 may be positioned in the field of view of one of the sensors 50 when the barrier 52 is in the retracted position, as shown in FIG. 5. Another of the transparent panels 70 may be positioned in the field of view of one of the sensors 50 when the barrier 52 is in the expanded position. The transparent panel 70 may be similarly flexible as the barrier sheet 66.

The barrier actuator 60 may include a motor 72 drivably coupled to the shaft 64 and in communication with the computer 56. The motor 72 may be disposed in one of the roof rails 48 and directly drive the shaft 64. Alternatively, the barrier actuator 60 may include, e.g., a belt or a gear system (not shown), through which the motor 72 may drive the shaft 64 indirectly. When the motor 72 drives the shaft 64 indirectly, the motor 72 may be spaced from the shaft 64 and located elsewhere in the vehicle 30.

Figure 7:
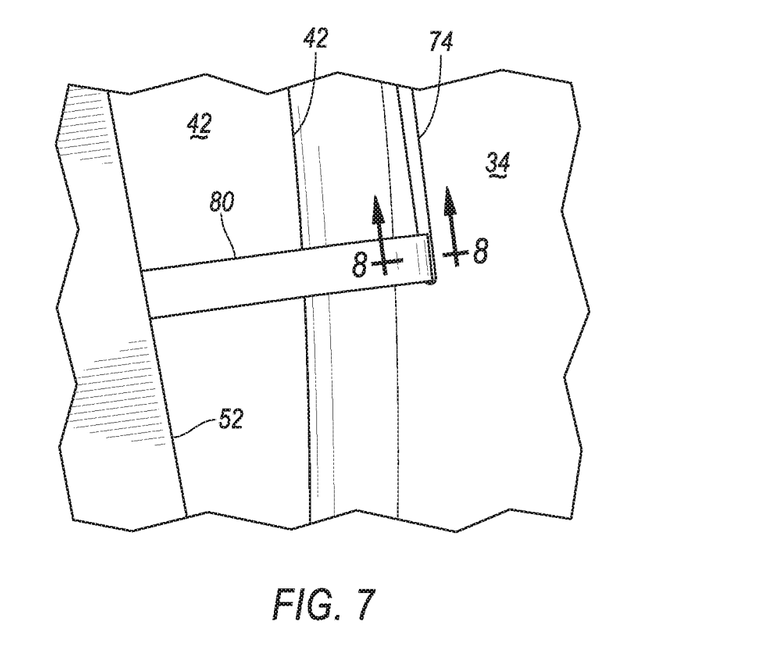
FIG. 7 is a perspective view of a pin and channel of the first example of the vehicle.
Figure 8:
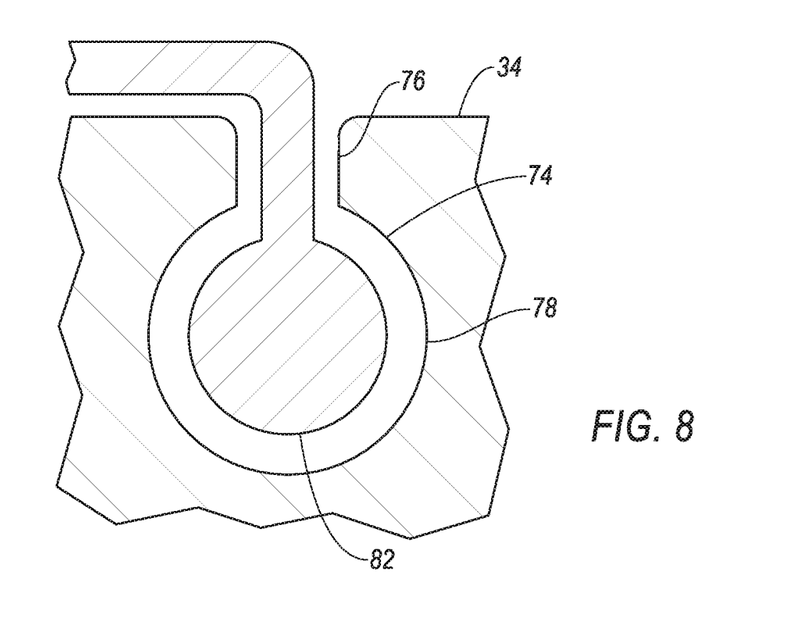
FIG. 8 is a cross-sectional view of the pin and the channel of the first example of the vehicle along line 8-8 in FIG. 7.

With reference to FIGS. 7 and 8, the A pillars 34 may each include a channel 74 extending lengthwise. The channels 74 may extend from an end near a top of the windshield 42 to an end near a bottom of the windshield 42. Each channel 74 has a cross-section including an opening 76 extending from a surface of the corresponding A pillar 34 and a passageway 78 connected to the opening 76. The passageways 78 may be wider than the openings 76.

The barrier 52 may include a plurality of pins 80, e.g., two pins 80, as shown in FIGS. 5 and 6. Each pin 80 may be disposed in one of the channels 74. The pins 80 each have a sliding portion 82 that is wider than the opening 76 disposed in the corresponding passageway 78. As the barrier 52 moves from the retracted position to the expanded position or vice versa, the sliding portions 82 of the pins 80 slide in the passageways 78 of the corresponding channels 74. The pins 80 hold the barrier sheet 66 across the windshield 42 and prevent the barrier sheet 66 from separating from the windshield 42, e.g., from wind flow.

When the computer 56 instructs the barrier actuator 60 to move the barrier 52 from the retracted position to the expanded position, the motor 72 rotates the shaft 64 so that the barrier 52 unwraps from the shaft 64. The pins 80 slide in the channels 74 as the barrier 52 moves across the windshield 42. To move the barrier 52 from the expanded position to the retracted position, the motor 72 operates in the opposite direction.

FIGS. 2 and 9-10 depict a second example of the vehicle 30 having the barrier 52. In this example, the barrier 52 has a fanlike structure. FIGS. 2 and 10 show two barriers 52, but one or any number of barriers 52 may be included.

With reference to FIGS. 2, 9, and 10, housings 84 may be fixed with respect to the windshield 42. The housings 84 may be positioned near the windshield 42, above, below, or to the side of the windshield 42. FIG. 2 shows one housing 84 above the windshield 42 and another housing 84 below the windshield 42. The housings 84 may have a tubular shape sized to accept the barrier 52 in the retracted position.

With reference to FIGS. 9 and 10, the barrier 52 includes a first rod 86 and a second rod 88. (The adjectives "first" and "second" are used throughout this document as identifiers and are not intended to signify importance or order.) The first and second rods 86, 88 are pivotally coupled to each other at a pivot point 90.

The barrier sheet 66 extends from the first rod 86 to the second rod 88. The barrier sheet 66 includes a plurality of folds 92 extending in a direction from the pivot point 90. When the barrier 52 is in the retracted position, the folds 92 may extend substantially parallel to each other, as shown in FIG. 9. When the barrier 52 is in the expanded position, the folds 92 may extend radially outward from the pivot point 90, as shown in FIG. 10.

The barrier 52 may include a plurality of wires 94 embedded in the barrier sheet 66. Each of the wires 94 may extend substantially parallel to a corresponding fold 92. The wires 94 may be stiffer than the barrier sheet 66, that is, less prone to bending. The wires 94 may prevent the barrier 52 from separating from the windshield 42 when in the expanded position.

The barrier actuator 60 may include a linear actuator 96 and a circumferential actuator 98. The linear actuator 96 may be positioned to push the barrier 52 out of and pull the barrier 52 into the housing 84. The circumferential actuator 98 may be positioned to move the first and second rods 86, 88 relative to each other about the pivot point 90. The circumferential actuator 98 may be, e.g., a solenoid. Alternatively, the barrier actuator 60 may include a spring (not shown) biased to push the first and second rods 86, 88 apart instead of the circumferential actuator 98.

The barrier 52 in the retracted position is disposed in the housing 84, as shown in FIG. 9. The barrier 52 in the expanded position extends out of the housing 84 over the windshield 42, as shown in FIG. 10. An angle between the rods 86, 88 is greater when the barrier 52 is in the expanded position than the retracted position.

When the computer 56 instructs the barrier actuator 60 to move the barrier 52 from the retracted position to the expanded position, the linear actuator 96 pushes the barrier 52 out of the housing 84, and the circumferential actuator 98 then fans out the rods 86, 88. Alternatively, the linear actuator 96 pushes the barrier 52 out of the housing 84, and with the rods 86, 88 unconstrained by the housing 84, the spring fans out the rods 86, 88. To move the barrier 52 from the expanded position to the retracted position, the circumferential actuator 98 pulls the rods 86, 88 together, and the linear actuator 96 pulls the barrier 52 into the housing 84. Alternatively, the linear actuator 96 pulls the barrier 52 into the housing 84, the edges of the housing 84 force together the rods 86, 88 against the force of the spring as the barrier 52 moves into the housing 84.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computers and computing devices such as discussed herein generally each include instructions executable by one or more computers such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computer is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process(es) discloses herein, one or more of the steps could be omitted, or the steps could be executed in a different order than shown. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A vehicle system, comprising:
a computer programmed to
determine from received vehicle operating data a risk of objects striking the windshield,
then, upon determining that the risk exceeds a threshold and that the vehicle is in an autonomous mode, and while the vehicle is traveling, instruct an actuator to move a barrier from a retracted position that exposes the windshield to an expanded position covering a majority of the windshield, and
upon determining that the risk exceeds the threshold and that the vehicle is in a semi-autonomous mode or a manual mode, and while the vehicle is traveling, instruct the actuator to maintain the barrier in the retracted position.

2. The vehicle system of claim 1, wherein the computer is further programmed to determine the risk based on receiving a signal from a sensor indicating that an object has struck the windshield.

3. The vehicle system of claim 1, wherein the computer is further programmed to determine the risk based on weather data indicating one of hail and high winds.

4. The vehicle system of claim 1, wherein the computer is further programmed to determine the risk based on receiving a vehicle-to-vehicle communication from a second vehicle indicating that an object has struck the second vehicle.

5. The vehicle system of claim 1, wherein the computer is further programmed to determine the risk based on a road condition of a road on which the vehicle is traveling.

6. The vehicle system of claim 1, wherein the computer is further programmed to calculate the risk as a weighted sum of a plurality of values of risk factors.

7. The vehicle system of claim 1, further comprising the barrier.

8. The vehicle system of claim 7, further comprising a shaft attachable to the windshield, wherein the barrier in the retracted position is wrapped about the shaft, and the barrier in the expanded position extends from the shaft over the windshield.

9. The vehicle system of claim 8, further comprising the windshield, a roof extending from the windshield, and two roof rails extending from the roof, wherein the shaft extends from a first to a second of the roof rails.

10. The vehicle system of claim 7, wherein the barrier includes a first rod, a second rod pivotally coupled to the first rod at a pivot point, and a barrier sheet extending from the first rod to the second rod.

11. The vehicle system of claim 10, wherein the barrier sheet includes a plurality of folds extending in a direction from the pivot point.

12. The vehicle system of claim 11, wherein an angle between the rods at the pivot point is greater when the barrier is in the expanded position than the retracted position.

13. A method comprising:
  while a vehicle is traveling, upon determining from received vehicle operating data that a risk of objects striking a windshield of the vehicle exceeds a threshold and that the vehicle is in an autonomous mode, instructing an actuator drivably coupled to a barrier to move the barrier from a retracted position exposing the windshield to an expanded position extending along a portion of the windshield; and
  while the vehicle is traveling, upon determining that the risk exceeds the threshold and that the vehicle is in a semi-autonomous mode or a manual mode, instructing the actuator to maintain the barrier in the retracted position.

14. The method of claim 13, further comprising determining the risk based on receiving a signal from a sensor indicating that an object has struck the windshield.

15. The method of claim 13, further comprising determining the risk based on weather data indicating one of hail and high winds.

16. The method of claim 13, further comprising determining the risk based on receiving a vehicle-to-vehicle communication from a second vehicle indicating that an object has struck the second vehicle.

17. The method of claim 13, further comprising determining the risk based on a road condition of a road on which the vehicle is traveling.

18. The method of claim 13, further comprising calculating the risk as a weighted sum of a plurality of values of risk factors.

19. A vehicle system, comprising:
  a barrier movable between a retracted position that exposes a windshield and an expanded position covering a majority of the windshield; and
  a computer programmed to
    determine from received vehicle operating data a risk of objects striking the windshield, and
    then, upon determining that the risk exceeds a threshold, and while the vehicle is traveling, instruct an actuator to move the barrier from the retracted position to the expanded position;
  wherein the barrier includes a first rod, a second rod pivotally coupled to the first rod at a pivot point, and a barrier sheet extending from the first rod to the second rod;
  the barrier sheet includes a plurality of folds extending in a direction from the pivot point; and
  an angle between the rods at the pivot point is greater when the barrier is in the expanded position than the retracted position.

\* \* \* \* \*